(12) United States Patent
Sinkko et al.

(10) Patent No.: US 10,214,094 B2
(45) Date of Patent: Feb. 26, 2019

(54) ELECTRICAL MOTOR CONSTRUCTION PROVIDED WITH A PLANETARY GEAR SYSTEM

(71) Applicant: SAIMAAN AMMATTIKORKEAKOULU OY, Lappeenranta (FI)

(72) Inventors: Simo Sinkko, Lappeenranta (FI); Tommi Nummelin, Lappeenranta (FI); Anssi Suuronen, Lappeenranta (FI); Juha Pyrhonen, Lappeenranta (FI)

(73) Assignee: LAPPEENRANNAN TEKNILLINEN YLIOPISTO, Lappeenranta (FI)

( * ) Notice: Subject to any disclaimer, the term of this patent is extended or adjusted under 35 U.S.C. 154(b) by 422 days.

(21) Appl. No.: 14/912,432

(22) PCT Filed: Aug. 18, 2014

(86) PCT No.: PCT/FI2014/050633
§ 371 (c)(1),
(2) Date: Feb. 17, 2016

(87) PCT Pub. No.: WO2015/025081
PCT Pub. Date: Feb. 26, 2015

(65) Prior Publication Data
US 2016/0201763 A1     Jul. 14, 2016

(30) Foreign Application Priority Data
Aug. 19, 2013  (FI) ...................................... 20135841

(51) Int. Cl.
*H02K 7/116*     (2006.01)
*B60K 7/00*      (2006.01)
(Continued)

(52) U.S. Cl.
CPC .......... *B60K 7/0007* (2013.01); *B60K 17/046* (2013.01); *F16H 3/44* (2013.01);
(Continued)

(58) Field of Classification Search
CPC ................ B60K 7/0007; B60K 17/046; B60K 2007/0092; B60K 2007/0038; H02K 7/116; F16H 2200/0034; F16H 2200/2097
See application file for complete search history.

(56) References Cited

U.S. PATENT DOCUMENTS 4,274,023 A       6/1981  Lamprey
6,458,057 B2 *   10/2002  Massaccesi .......... B60K 17/046
                                                          180/372
(Continued)

FOREIGN PATENT DOCUMENTS

CN         103051102           4/2013
DE    10 2011 079 975 A1       1/2013
(Continued)

OTHER PUBLICATIONS

Finland Search Report dated Mar. 12, 2014; Application No. 20135841.
(Continued)

*Primary Examiner* — Sherry L Estremsky
(74) *Attorney, Agent, or Firm* — Young & Thompson

(57) ABSTRACT

An electric motor construction is provided with a planetary gear system, including an annular thin-rimmed stator (1) as well as a torque takeoff shaft (2) concentric relative thereto. The construction includes inside the stator (1) an annular thin-rimmed rotor (3); a sun gear (4) fixedly coupled to the rotor and concentric with the takeoff shaft (2); an intra-rotor immovably coupled ring gear (5) with a toothed inner surface; planet gears (6) meshing with the ring gear and the sun gear; a planet carrier (7) that the planet gears are supported on; as well as a coupling arrangement (8) for (Continued)

transmitting torque of the rotor optionally directly or by way of the planet carrier to the torque takeoff shaft.

5 Claims, 2 Drawing Sheets

(51) Int. Cl.
    *B60K 17/04*     (2006.01)
    *F16H 3/44*     (2006.01)
    *F16H 3/54*     (2006.01)

(52) U.S. Cl.
    CPC ...... *H02K 7/116* (2013.01); *B60K 2007/0038* (2013.01); *B60K 2007/0092* (2013.01); *F16H 3/54* (2013.01)

(56) References Cited

U.S. PATENT DOCUMENTS

| | | | |
|---|---|---|---|
| 6,474,428 B1 | 11/2002 | Fujikawa et al. | |
| 7,621,835 B2* | 11/2009 | Oshidari | B60K 7/0007 180/372 |
| 8,424,625 B2* | 4/2013 | Ishii | B60K 6/26 180/65.31 |
| 2003/0230443 A1* | 12/2003 | Cramer | B60G 3/20 180/65.51 |
| 2007/0179010 A1 | 8/2007 | Pritchard et al. | |
| 2010/0187954 A1 | 7/2010 | Kendall et al. | |
| 2013/0048394 A1 | 2/2013 | Su et al. | |
| 2013/0049439 A1 | 2/2013 | Yamada et al. | |
| 2017/0232840 A1* | 8/2017 | Pritchard | B60K 17/344 74/665 GE |
| 2017/0253144 A1* | 9/2017 | Arima | B60K 7/0007 |

FOREIGN PATENT DOCUMENTS

| | | | | |
|---|---|---|---|---|
| DE | 10 2012 216 130 A1 | | 8/2013 | |
| DE | 102012216130 A1 | * | 8/2013 | ............ B60K 17/08 |
| JP | 61251445 | | 11/1986 | |
| WO | 2008/069707 A1 | | 6/2008 | |
| WO | 2008/131358 A1 | | 10/2008 | |

OTHER PUBLICATIONS

Wikipedia website on the Internet page: "A simple planetary gear", published in May 4, 2013, [retrieved Nov. 3, 2014] URL: http://fi.wikipedia.org/wiki/Yksinkertainen_planeettavaihde (the entire English machine translation).

International Search Report, dated Dec. 16, 2014, from corresponding PCT Applicatin.

* cited by examiner

ELECTRICAL MOTOR CONSTRUCTION PROVIDED WITH A PLANETARY GEAR SYSTEM

FIELD OF THE INVENTION

The invention relates to an electric motor construction provided with a planetary gear system as presented in the preamble of claim 1.

BACKGROUND OF THE INVENTION

Various pieces of heavy equipment, such as for example tractors, forest machines, earthmoving machines, forklifts and the like, have traditionally involved the use of mechanical drive train with a possibility of selecting a low-range gear system for working and a high-range gear system for driving from site to site. To an increasing extent, however, the drive train in heavy equipment is currently implemented with wheel-specific hub motors. Le, with a hydraulic motor or electric motor mounted on the hub of a wheel or constituting a hub as this type of arrangement provides most degrees of freedom for designing and performance of the machine. Space in a wheel hub is limited, which is why the motors generally come in a single-speed version. Therefore, the torque characteristics and operating characteristics of motors must be selected in compliance with low-speed working requirements, which is why the site-to-site drives of heavy equipment proceed at an unnecessarily slow speed or have to be carried out with separate transport equipment.

OBJECT OF THE INVENTION

An object of the invention is to eliminate the above-mentioned drawbacks of prior art. Specifically, an object of the invention is to introduce a novel type of electric motor-based hub traction motor for a heavy machine, which enables the use of a wheel-specific gear system and thereby separately the slow and fast driving of a heavy machine equipped with the hub motor.

SUMMARY OF THE INVENTION

The electric motor construction provided with a planetary gear system according to the invention comprises an annular, thin-rimmed stator as well as a torque takeoff shaft concentric relative thereto. According to the invention, the construction comprises inside the stator an annular and thin-rimmed rotor, to which is fixedly coupled a sun gear concentric with the takeoff shaft. The construction further includes an intra-rotor immovably coupled ring gear with a toothed inner surface, as well as planet gears present between the ring gear and the sun gear and meshing with both of those and supported on a planet carrier. The planet carrier is concentric with the takeoff shaft. Hence, the planet carrier is capable of rotating around the takeoff shaft, whereby the planet gears are also capable of rotating both along with the planet carrier around the takeoff shaft and around their own axes. In addition, the construction according to the invention includes a coupling arrangement for transmitting the rotor torque optionally directly or by way of the plane carrier to the takeoff shaft. Thus, the coupling arrangement provides a means of transmitting power of the electric motor to the takeoff shaft either directly at high speed and low torque or by way of the planetary gear system at low speed and high torque.

The above-mentioned coupling arrangement comprises two separate couplings, i.e. a first coupling by means of which a collectively rotating assembly constituted by the electric machine's rotor and sun gear can be directly coupled to the takeoff shaft, as well as a second coupling by means of which the planet carrier can be coupled directly to the takeoff shaft. Because these two couplings establish unequal gear ratios between the electric motor's rotor and takeoff shaft, it is natural that the unintentional simultaneous activation thereof is prevented. This may have been implemented mechanically by having the couplings move simultaneously. Electrical intercoupling is also possible. In one embodiment of the invention, such a simultaneous activation is nevertheless possible whenever the motor is not rotating. This is an easy way of implementing a functionally reliable and simple holding brake without separate brake components.

Each of the above-mentioned first and second couplings includes around the takeoff shaft a coupling sleeve, which is adapted to be rotationally rigid yet longitudinally movable relative to the takeoff shaft. In one embodiment of the invention, the coupling sleeve and the collectively rotating assembly made up by the rotor and the sun gear include, and likewise the coupling sleeve and the planet carrier include complementary coupling elements for coupling the same to each other in a rotationally rigid manner by means of a movement of the coupling sleeve in the direction of the takeoff shaft. Thus, in a certain position thereof, the coupling sleeve rotates freely along with the takeoff shaft and in another position, displaced in a longitudinal direction of the takeoff shaft, the coupling sleeve engages in a rotationally rigid manner either with the rotor or the sun gear in such a way that the takeoff shaft rotates together with and at the same speed as the rotor or the sun gear. Hence, in this embodiment, the takeoff shaft extends through the electric motor construction provided with a planetary gear system in such a way that the couplings, executed by the gear system and having two different gear ratios, take place with the same rigid shaft on various sides of the electric motor construction.

In a coupling arrangement according to one embodiment of the invention, the planet carrier is mounted rigidly on a takeoff shaft extending through the actual electric motor construction, whereby an alternative coupling arrangement is provided on the same side of the electric motor construction around the takeoff shaft. In this case, preferably, the coupling arrangement comprises a first cogwheel coupled with the rotor, i.e. rotating at the same speed therewith, a second cogwheel, which is similar in terms of its diameter and toothing and concentric and coupled by way of the takeoff shaft to the planet carrier and rotating at the same speed therewith, as well as a third cogwheel, which is similar in terms of its diameter and toothing and concentric and coupled to the takeoff shaft delivering the rotational torque out of the entire assembly. In addition, all three concentric and equi-circumferential cogwheels are surrounded by a common coupling sleeve by means of which the transmission of rotational torque is alternatively implementable between the first and third or the second and third cogwheels.

In order to prevent a simultaneous activation of the first and second cogwheels, these are appropriately arranged, in one embodiment of the invention, at a distance from each other, i.e. between these is included a vacant space or a fourth cogwheel rotating freely around the takeoff shaft. This space or cogwheel provides the construction with a neutral gear, whereby the motor's torque is not transmitted out of the construction to the takeoff shaft.

In one preferred coupling sleeve design, it has its inner surface provided with two spaced-apart gear rings, which, by optionally moving the coupling sleeve in a longitudinal direction, i.e. in axial direction, are capable of being coupled between the first and third, second and third, or fourth/vacant space and third cogwheels.

What needs to be selected for the electric motor construction provided with a planetary gear system is a type of electric motor whose rotor can be left hollow on the inside for fitting a planetary gear system inside the rotor. The rotor and stator of an electric machine each has a so-called yoke by way of which a magnetic flux becomes guided to adjacent pole regions. The required height of a yoke depends on structural materials of the yoke and the width of a machine's pole, such that half of a magnetic flux passing through the magnetic pole has enough room to pass by way of the rotor yoke, and on the stator side by way of the stator yoke, respectively, without adversely saturating the same or without causing excessive losses.

Normally, the magnetic circuits of stator and rotor are constructed from electrical sheet steel and a recommendation in basic textbooks of the art is that the flux density in yokes not be allowed to exceed 1.5 teslas. Normally in the context of magnetic circuits constructed of steel, the maximum value of air-gap flux density is approximately $B_{max}=1$ T. It is presumed that the pole width is TAU. In this case, the highest possible magnetic flux passing by way of the pole is $c \times TAU \times B_{max} \times 1'$, wherein $1'$ is the machine's magnetic length. If $B_{max}=1$ T, the flux passing by way of the yoke will be $(c \times TAU \times 1\,T \times 1')/2$. Since the yoke has a length of approximately $1'$ and the maximum flux density in rotor yoke $B_{yr}=1.5$ T, the height of rotor yoke will be $y_r=(c \times TAU \times 1\,T \times 1'/2)/(1' \times B_{yr})=c \times TAU/3$. If the air-gap flux density is sinusoidal, the obtained value of c will be $c=0.64$. If the distribution of air-gap flux density is trapezoidal, the value of c shall grow towards one. Hence, the obtained yoke height will be $y_r=(0.21-0.3)$ TAU. This goes to show that the narrower the pole pitch TAU in a machine the lower is the yoke needed for a rotor ($y_r$) and likewise for a stator ($y_s$).

It will be noticed that the yokes of a highly multi-pole machine will be thin. When the pole pitch TAU is narrow, it takes a multitude of poles for filling the machine's periphery with magnetic poles, and the machine's pole pair number p will be high.

According to the basic theory of electrical machines, the magnetizing inductance of a machine is inversely proportional to the square of the machine's pole pair number p. The magnetizing inductance partially determines the demand of magnetizing current e.g. for a short circuit motor. Machines with a high yoke and a low p require plenty of magnetizing current, leading to a poor power factor. Therefore, the induction motor has poor characteristics in cases involving highly multi-pole machines. The induction machine is at its best with p=1 or 2.

In the process of designing a planetary gear system-equipped electric, motor construction, it is necessary to choose a type of motor which does not suffer, from low magnetizing inductance like the induction motor. Such machine types include a separately excited synchronous motor and a permanent magnet synchronous motor, as well as a double salient-pole reluctance machine, a so-called switched reluctance machine.

Hence, machines most suitable for a planetary gear system-equipped electric motor construction of the invention are in practice the permanent magnet synchronous motor and the switched reluctance motor both of which can be constructed with so-called field coils. In a field coil machine, the stator winding overhangs become the shortest possible. Thereby, a very thin-rimmed, multi-pole traction motor, which nevertheless has good electrical properties, will be obtained for the motor construction provided with a planetary gear system. Thus, the planetary gear has no problems fitting inside the motor.

Merits of the Invention

The electric motor construction according to the invention, provided with a planetary gear system, has major benefits over the prior art. In various types of heavy equipment and the like, the invention enables the use of wheel-specific electric motors jointly with two-speed mechanical gears. Hence, the invention simplifies and lightens technical structures employed in heavy equipment. Further, with respect to traditional hydraulic drives, the invention makes it possible to provide considerably more compact motors that can also be continuously operated in optimum conditions. This is facilitated by the joint use of a motor according to the invention and a sufficient battery pack or supercapacitor. Hence, the generator-driving diesel engine rotates at a substantially constant power and the battery pack is either discharged or recharged continuously according to what is the current electrical power demand of the motors. This arrangement reduces significantly the consumption of fuel, as well as increases the longevity of an employed motor when compared to traditional hydraulic drives.

BRIEF DESCRIPTION OF THE DRAWINGS

The invention will now be described in detail with reference to the accompanying drawings, in which.

DETAILED DESCRIPTION OF THE INVENTION

Figure 1:
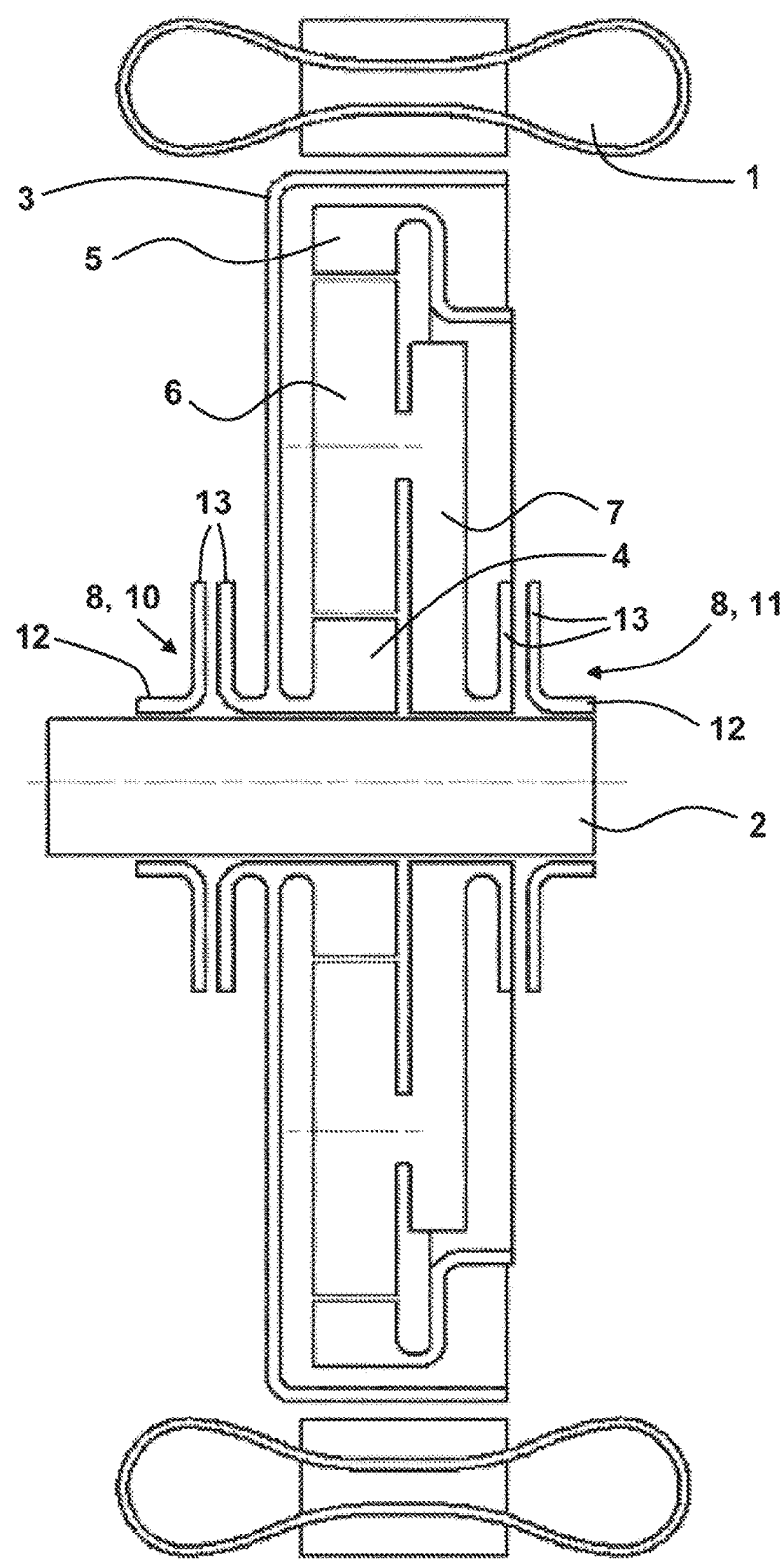
FIG. 1 shows schematically one construction of the invention.

FIG. 1 shows in a schematic illustration an annular stator 1, and in the middle thereof a takeoff shaft 2 extending through the construction in a substantially concentric relationship with the stator. Around the takeoff shaft 2 is a sun gear 4, which rotates relative thereto and makes up a fixed and jointly rotating structure with the electric motor's peripheral rotor 3 located in the proximity of the stator 1. Inside the rotor 3 is a ring gear 5, i.e. a ring provided with an internal toothed rim, which is fixed relative to said stator 1. Between the toothed rim of the ring gear 5 and a toothed outer surface rim of the sun gear 4 are located respectively toothed planet gears 6 meshing with both of these. The planet gears 6 are rotatably mounted with bearings on a common planet carrier 7, which constitutes a disc type structure rotating around the takeoff shaft 2. Thus, when the rotor 3 rotates at a given speed, the sun gear 4 rotates around the takeoff shaft 2 at the same speed and the planet carrier 7 rotates around the takeoff shaft at a reduced speed, said reduced speed depending on a gear ratio set up in the planetary gear system.

Between the aforesaid components, which rotate around the takeoff shaft 2, and the takeoff shaft is a coupling arrangement 8 for rotating the takeoff shaft either directly at a rotating speed of the rotor or at a rotating speed of the planet carrier 7. The coupling arrangement includes a first coupling 10, having around the takeoff shaft 2 a coupling sleeve 12. It is capable of sliding in a longitudinal direction of the takeoff shaft with respect thereto, but rotationally rigid in a transverse direction of the shaft. The coupling 10 further includes a coupling element 13, and a second respective coupling element 13 is supported on an assembly made up by the sun gear 4 and the rotor 3. The coupling elements 13 are engageable with each other for a jointly rotating assembly. The coupling elements can be clutch discs, which allow for some sliding in the coupling situation, or else can be provided with appropriate coupling recesses or the like for locking the same, while stationary, in a rotationally rigid manner to each other.

A perfectly equivalent second coupling 11 is arranged on the other edge of the construction between the takeoff shaft 2 and the planet carrier 7. There, around the shaft is a coupling sleeve 12 and a coupling element 13, extending radially therefrom and having its counterpart, i.e. a second coupling element 13, mounted on the planet carrier 7. Hence, by moving the coupling 11 in a longitudinal direction of the takeoff shaft 2 around the same, the planet carrier is capable of being engaged with the takeoff shaft to be rotatable therewith or disengaged therefrom. This way, the takeoff shaft 2 can be optionally rotated through the intermediary of the first coupling 10 and the second coupling 11 either directly at a rotating speed of the rotor or at a reduced rotating speed determined by the planetary gear system.

Figure 2:
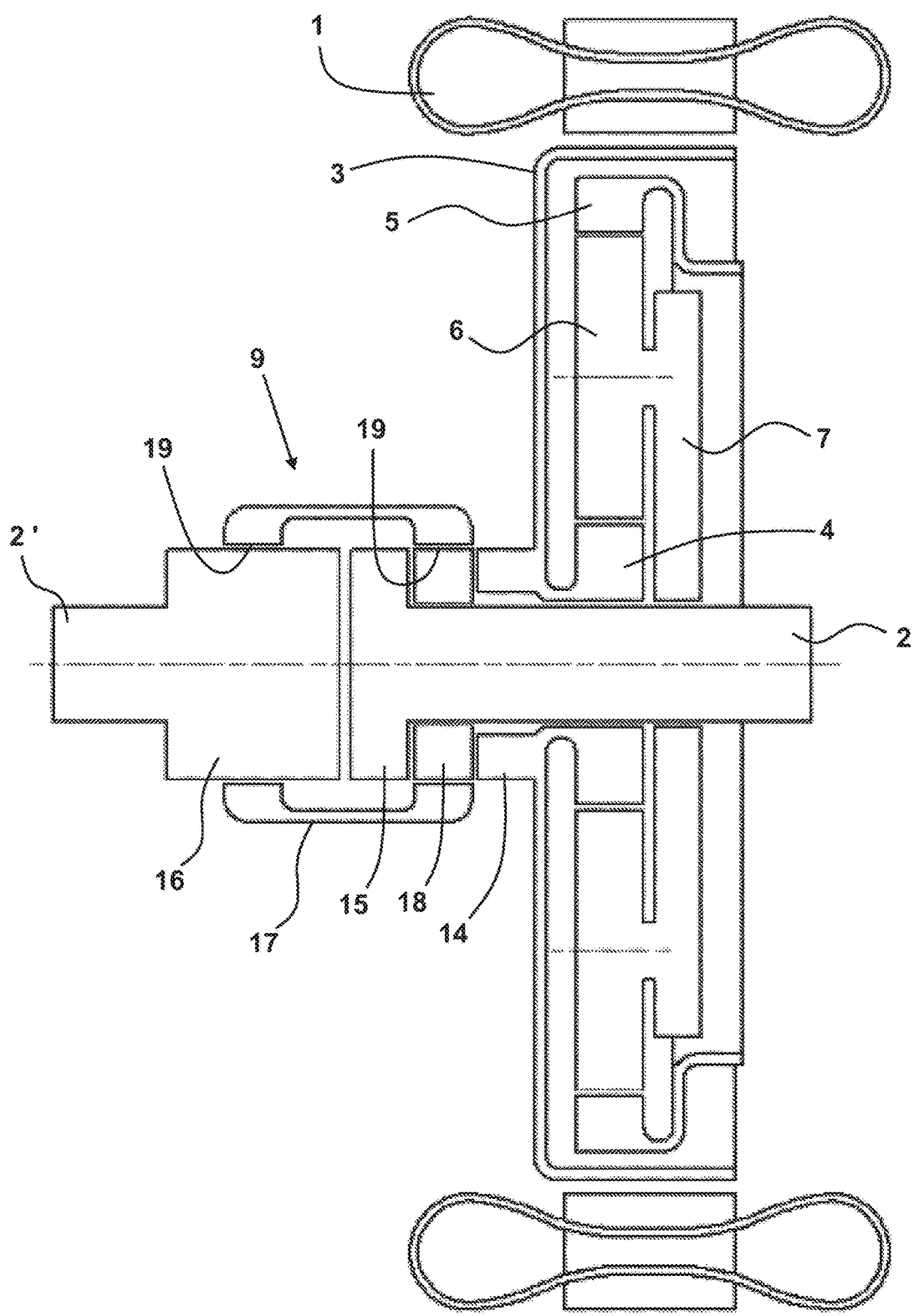
FIG. 2 shows schematically a second construction of the invention.

FIG. 2 shows a second embodiment of the invention, wherein a disk shaped electric motor and its internal planetary gear system are exactly similar to those in the embodiment of FIG. 1. Thus, those shall not be described again in this context. On the other hand, the gear system, i.e. a coupling arrangement 9, is different.

In the embodiment of FIG. 2, the takeoff shaft 2 extending through the electric motor and the planetary gear system is coupled to the planet carrier 7 in such a way that these are always rotating together and at an equal rotating speed. Thereby, the torque is transmitted from the planet carrier by way of the takeoff shaft through the construction to the side of the construction provided with the rotor 3. Here the takeoff shaft 2 terminates and has at its end a second cogwheel 15. A first cogwheel 14 of matching size and shape is disposed around the takeoff shaft and spaced therefrom in attachment with an assembly made up by the sun gear 4 and the rotor 3. Between the first and second cogwheels 14 and 15, around the takeoff shaft 2, is included a fourth cogwheel 18, which, in terms of its toothed rim, is identical to the first and second cogwheels. The fourth cogwheel 18 is able to rotate freely around the takeoff shaft.

As an extension of the takeoff shaft 2, forward of the second cogwheel 15, there is a third cogwheel 16, from which extends an actual takeoff shaft 2 for delivering torque out of the construction. In terms of its axial length, the third cogwheel 16 is about triple the axial length of the other cogwheels, i.e. approximately equal to an aggregate respective length of the other three cogwheels. All four cogwheels 14, 15, 16 and 18, as well as both takeoff shafts 2, 2', are concentric, i.e. have coinciding axes of rotation. Around the cogwheels is arranged a coupling sleeve 17 whose internal surface, at both ends of the sleeve, comprises a toothed rim 19. Its width matches substantially that of the narrower cogwheels 14, 15 and 18. The toothed rim has its toothing matching that of the cogwheels, such that, when coincided, these establish a power transmission coupling. Moreover, the coupling sleeve 17 is movable in a longitudinal direction, i.e. in axial direction, in such a way that, while the toothed rim 19 of one edge is always in power transmission contact with the third cogwheel 16, the toothed rim 19 of the other edge is in power transmission contact optionally with the first, second or fourth cogwheel 14, 15 or 18. This way, the power takeoff shaft 2' can be alternatively provided directly with a rotating speed of the rotor 3, a reduced rotating speed transmitted by the planetary gear system, or a neutral gear.

Hereinabove, the invention has been described by way of examples with the assistance of the accompanying drawings without restricting the invention by any means to the presented constructions.

The invention claimed is:

1. An electric motor construction comprising:
   a planetary gear system comprising
      an annular stator,
      a torque takeoff shaft concentric relative to the stator,
      an annular rotor inside the stator,
      a sun gear fixedly coupled to the rotor and concentric with the takeoff shaft,
      an intra-rotor immovably-coupled ring gear with a toothed inner surface,
      planet gears meshing with the ring gear and the sun gear, and
      a planet carrier on which the planet gears are supported; and
   a coupling arrangement configured to transmit torque of the rotor one of directly and by the planet carrier to said torque takeoff shaft, the coupling arrangement comprising
      a first coupling configured to couple a collectively-rotating assembly, constituted by the rotor and the sun gear, to the takeoff shaft, and
      a second coupling configured to couple the planet carrier directly to the takeoff shaft,
      each of the first and second couplings comprising a coupling sleeve around the takeoff shaft, the coupling sleeve being rotationally rigid but movable in a longitudinal direction relative to the takeoff shaft.

2. The electric motor construction according to claim 1, wherein the first coupling and the second coupling are connected to each other to prevent simultaneous coupling when the electric motor construction is rotating.

3. The electric motor construction according to claim 1, wherein the coupling sleeve and the collectively-rotating assembly constituted by the rotor and the sun gear, include complementary first and second coupling elements configured to couple the first and second coupling element to each other in a rotationally rigid manner by a movement of the coupling sleeve in the direction of the takeoff shaft.

4. The electric motor construction according to claim 1, further comprising a permanent magnet synchronous motor.

5. The electric motor construction according to claim 1, further comprising a switched reluctance motor.

* * * * *